Patented June 17, 1941

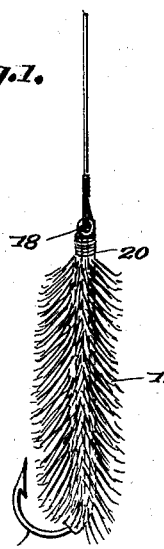
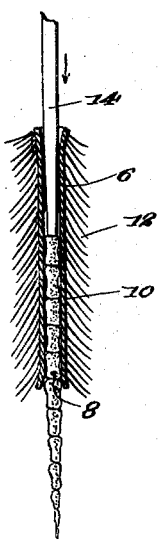
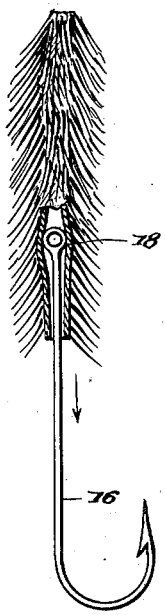
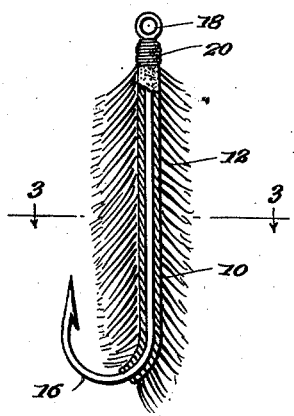
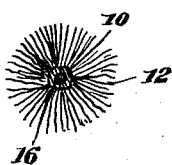

2,246,428

UNITED STATES PATENT OFFICE 2,246,428

FISH FLY

Nelson Henry Berlew, Cortland, N. Y.

Application April 18, 1939, Serial No. 268,594

1 Claim. (Cl. 43—48)

The present invention relates to fishing tackle and more specifically to a novelly constructed fish fly.

One of the objects of the present invention is to provide a fish fly which is durable and will not fade in color.

A still further important object of the invention is to provide a fly which will remain after long use thereof soft and pliable and the hair will not become brittle and subsequently break.

Another important object of the present invention is to provide a wet fish fly which is constructed from the tail of an animal, such as the woodchuck, chipmunk, weasel, red squirrel, mink or the like.

The present invention contemplates the construction of a wet fish fly from the tail of a suitable animal which by means of a novel process enables the hook to be securely fastened therein to the end that when the fly is thrown into the water, the hair fluffs outwardly and quivers when drawn through the water resembling a live creature.

In the accompanying drawing wherein corresponding parts are designated by similar reference numerals—

Figure 1 is a front elevational view of the fly,

Figure 2 is a vertical sectional of Figure 1,

Figure 3 is a horizontal sectional view of Figure 2 taken on line 3—3 thereof, looking in the direction of the arrows, Figure 4 is a vertical sectional view of a section of the tail of the animal from which the fly is constructed, illustrating the manner in which the bone thereof is removed, and Figure 5 is a front elevational view of a section of the tail partly in section, illustrating the manner in which the hook is inserted longitudinally and centrally of the tail after the tail bone has been removed.

In the accompanying drawing wherein for the purpose of illustration there is shown a preferred embodiment of the invention, the reference numeral 6 generally designates a section or portion of the tail of a woodchuck, chipmunk, weasel, red squirrel, mink or any other suitable animal which, as is well known, has a centrally disposed tail bone 8 and the hide portion 10 from which the hair 12 has grown.

As clearly illustrated in Figure 4 the tail section may be cut in any lengths depending upon the size of the fish hook, and the centrally disposed tail bone structure is forced from the tail section by means of the small rod 14 or the like.

After the tail bone structure 8 has been removed therefrom, as clearly shown in Figure 5, the elongated portion of the hook 16 is run through the tail section in the opening left by the removal of the tail bone and the eye portion 18 of the hook projects therethrough terminating adjacent the end of the tail section.

The tail section is then firmly secured to the hook 16 by the winding of a thread 20 around the end of the tail section adjacent the eye 18.

In this connection it is to be noted that the hook 16 is inserted in the tail section with the hair falling backwardly toward the sharp end portion of the hook.

Thus, it will be apparent from the foregoing description, that when the line is secured to the eye of the hook, and the fly thrown into the water, upon a pulling in the well known manner of the line during the fishing operation, the hair fluffs outwardly and quivers when drawn through the water resembling a live creature.

While there is shown for the purpose of illustration a preferred embodiment of the invention, it is to be understood, that it is capable of various changes and modifications without departing from the spirit and scope thereof, and it is intended therefore, that only such limitations shall be imposed thereon as are indicated in the prior art or in the appended claim.

What is claimed is:

A fishing fly of the class described comprising a section of the tail of an animal having the bone removed therefrom, and a fish hook having its elongated portion disposed longitudinally in the section where the bone was removed therefrom with the eye of the fish hook projecting from one end of the section and the sharp end of the fish hook from the other end of the section thereof, and a cord wrapped around the section adjacent the hook end of the fish hook for securing the section to the fish hook.

NELSON HENRY BERLEW.